US012761535B2

(12) United States Patent
Simons et al.

(10) Patent No.: US 12,761,535 B2
(45) Date of Patent: Oct. 13, 2026

(54) CABLE ROUTING DEVICE

(71) Applicant: Imaging Brands, Inc., Phoenix, AZ (US)

(72) Inventors: Josh Simons, Phoenix, AZ (US); Michael Bargiel, Phoenix, AZ (US)

(73) Assignee: Imaging Brands, Inc., Phoenix, AZ (US)

( * ) Notice: Subject to any disclaimer, the term of this patent is extended or adjusted under 35 U.S.C. 154(b) by 147 days.

(21) Appl. No.: 18/428,559

(22) Filed: Jan. 31, 2024

(65) Prior Publication Data

US 2025/0244643 A1 Jul. 31, 2025

(51) Int. Cl.
*G03B 17/56* (2021.01)

(52) U.S. Cl.
CPC .................................. *G03B 17/561* (2013.01)

(58) Field of Classification Search
CPC ........ H02G 3/0437; A62B 1/14; A62B 35/04; A62B 35/005; A62B 35/008
See application file for complete search history.

(56) References Cited

U.S. PATENT DOCUMENTS

| | | | | |
|---|---|---|---|---|
| D675,661 | S | 2/2013 | Jannard et al. | |
| D752,677 | S | 3/2016 | Fliger | |
| 10,638,805 | B2 * | 5/2020 | Fella | B33Y 80/00 |
| D945,517 | S | 3/2022 | Wu et al. | |
| D1,001,873 | S | 10/2023 | Zhang | |
| D1,008,344 | S | 12/2023 | Schaller | |
| D1,023,114 | S | 4/2024 | Wang et al. | |
| D1,023,115 | S | 4/2024 | Vitale et al. | |
| D1,028,065 | S | 5/2024 | Wang | |
| D1,048,151 | S | 10/2024 | Ren et al. | |
| 2009/0045010 | A1 * | 2/2009 | Jordan | A62B 1/14 182/5 |
| 2023/0397357 | A1 * | 12/2023 | Södergård | G08B 13/1963 |
| 2025/0085618 | A1 | 3/2025 | Chan et al. | |

OTHER PUBLICATIONS

TetherBlock product description (https://web.archive.org/web/20230130042658/https://www.designinfo.in/c/photography-camera-accessories/tether-tools/tether-tools-cable-management/tether-tools-cable-management-tetherblock/. Accessed Sep. 2, 2025. Archived Jan. 30, 2023) (Year: 2023).*
IQwire QRCL :: Quick Release Cable Lock, by Nine Volt, https://nine-volt.com/products/iqwire-qrcl-quick-release-cable-lock-tether-lock, accessed on Dec. 28, 2023.
Quick Release Tether Cable Lock, by Faini Made, https://faini-made.square.site/product/quickrelasetetherlock/45?cs=true&cst=custom, accessed on Dec. 28, 2023.

* cited by examiner

*Primary Examiner* — Noam Reisner
(74) *Attorney, Agent, or Firm* — Galvani Smith PLLC; Thomas W. Galvani; Rowan P. Smith

(57) ABSTRACT

A cable routing device for managing a cable connected to a camera includes a body having a top and an opposed bottom, and a channel extending from one side of the body to another side of the body, wherein the channel is open in a first direction to the bottom, away from the top. A latch is mounted for pivotal movement and biased to move an abutment face of the latch in a second direction transverse to the first direction to capture a cable applied in the channel.

20 Claims, 7 Drawing Sheets

CABLE ROUTING DEVICE

FIELD

The present specification relates generally to electronics, and more particularly to electronic cables.

BACKGROUND

Even with the growth of wireless data transmission, photographers and videographers still attach cables to most of their electronics. Cables transmit data from one end to another, coupling two devices in rapid and reliable data communication.

Because photographers and videographers still rely on cables so heavily, management of those cables is important. Slack in a cable is an annoyance. It is unsightly and appears disorganized. When a cable is longer than it needs to be, it can also be a hazard. A loop of cable is easy to hit or catch, and every time the cable is hit or caught, it wiggles, loosens, or bends, potentially disconnecting from the data port or even damaging the data port itself. Someone walking by or moving their arms can accidentally catch a cable and pull it loose from its connection. Worse, someone can trip on the cable, or can actually pull a camera off a table and onto the floor, causing thousands of dollars of damage. Photographers and videographers often try to arrange or even tape cables to the table or the floor to prevent such damage.

Similarly, when a photographer or videographer uses a tripod, he often routes the cable in a particular way. If the cable is not neatly managed, this can present a catch risk. While there are some conventional routing plates to manage camera cables, they can be bulky or interfere with the way the camera engages with the tripod. They can also often make changing a cable cumbersome. For example, some conventional routing plates must be entirely removed from both the tripod and the camera just to adjust or replace a cable. Others have multiple plates or pieces that must be removed in order to adjust or replace the cable.

Reducing the likelihood that a camera or tripod will be brought down is important. Making camera cable management easier is also important. There is a real need for a device which presents solutions to these issues.

SUMMARY

In an embodiment, a cable routing device for managing a cable connected to a camera includes a body having a top and an opposed bottom, and a channel extending from one side of the body to another side of the body, wherein the channel is open in a first direction to the bottom, away from the top. A latch is mounted for pivotal movement and biased to move an abutment face of the latch in a second direction transverse to the first direction to capture a cable applied in the channel.

In embodiments, the channel curves in the second direction. The channel has a path extending entirely between the one side and the other side of the body, and the channel is open along the entire path. The channel includes a first sidewall including a first projection of the sidewall into the channel, and a second sidewall including a second projection of the sidewall into the channel. The first and second projections are offset from each other along the channel and project into the channel from opposite directions. A tongue projects into the channel at the bottom. The tongue defines a first tongue, and a second tongue projects into the channel at the bottom, and the first and second tongues flank the first and second projections and project into the channel from opposite sides of the channel.

In an embodiment, a cable routing device includes a body having a top and an opposed bottom, and a channel extending from one side of the body to another side of the body. The channel is open in a first direction to the bottom. The channel curves in a second direction which is transverse to the first direction.

In embodiments, the channel has a path extending entirely between the one side and the other side of the body, and the channel is open along the entire path. A trap is configured to bias a cable applied to the channel in the second direction. The channel includes a first sidewall defining a first projection of the sidewall, and a second sidewall having a second projection of the sidewall. The first and second projections are offset from each other along the channel and project in opposite directions to each other. A latch is mounted for pivotal movement and biased to move an abutment face of the latch in the second direction against a sidewall of the channel. A tongue projects into the channel at the bottom. The tongue defines a first tongue, and a second tongue projects into the channel at the bottom, and the first and second tongues flank the first and second projections.

In an embodiment, a cable routing device includes a top configured to be applied to an underside of the camera, and a channel extending from one side of the cable routing device to another side, wherein the channel is open in a first direction away from the top. The channel curves in a second direction which is transverse to the first direction.

In embodiments, the channel is open entirely between the one side and the other side. A trap is configured to bias a cable applied to the channel in the second direction. The channel includes a first sidewall defining a first projection of the sidewall, and a second sidewall having a second projection of the sidewall. The first and second projections are offset from each other along the channel and project in opposite directions to each other. A latch is mounted for pivotal movement and biased to move an abutment face of the latch in the second direction against a sidewall of the channel. A tongue projects into the channel at the bottom. The tongue defines a first tongue, and a second tongue projects into the channel at the bottom, and the first and second tongues flank the first and second projections. A bump within the channel projects downward from a ceiling of the channel toward the bottom.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings.

DETAILED DESCRIPTION

Figure 1:
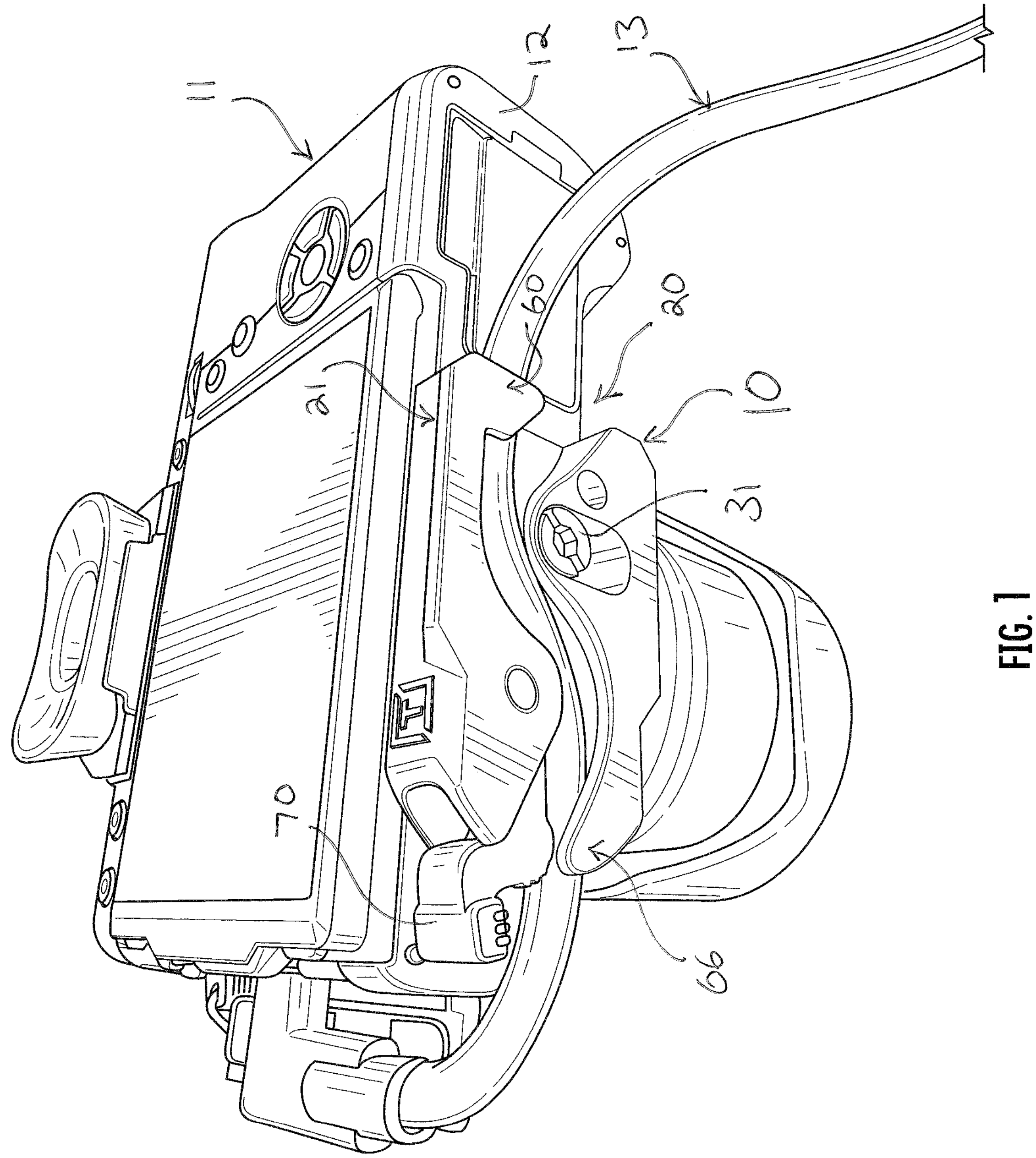
FIG. 1 is a bottom perspective view of a cable routing device applied to the underside of a camera.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

FIG. 1 illustrates a cable routing device 10 secured to an underside 12 of a camera 11, with a cable 13 routed through the device 10. The camera 11 is exemplary of any kind of conventional SLR or DSLR camera, or any camera that includes a threaded socket for mounting to a tripod. The cable 13 is exemplary of any kind of cable with any kind of diameter, such as a USB cable, HDMI cable, audio cable, data cable, or the like. The reader will understand that the camera 11 and cable 13 are merely exemplary and not limiting of the types of cameras or cables that can be used with the cable routing device 10.

The routing device 10 shown in the embodiment of these drawings is a plate, and has a post which threadably engages with the threaded socket on the underside 12 of the camera 11. It thus is held securely against the underside 12. The routing device 10 includes a channel 20 through which the cable 13 passes and is retained therein. The routing device 10 also includes a rail 21 to engage with the quick-release head of a tripod or a video cage or other mount or accessory. When the cable 13 is routed through the routing device 10, the cable 13 is managed and the camera 11 can be locked into a tripod. If the cable 13 needs to be changed or moved, the camera 11 can be quickly removed from the tripod and the cable 13 adjusted without decoupling the routing device 10. This allows the photographer to make quick changes without intricate disassembly.

Figure 2:
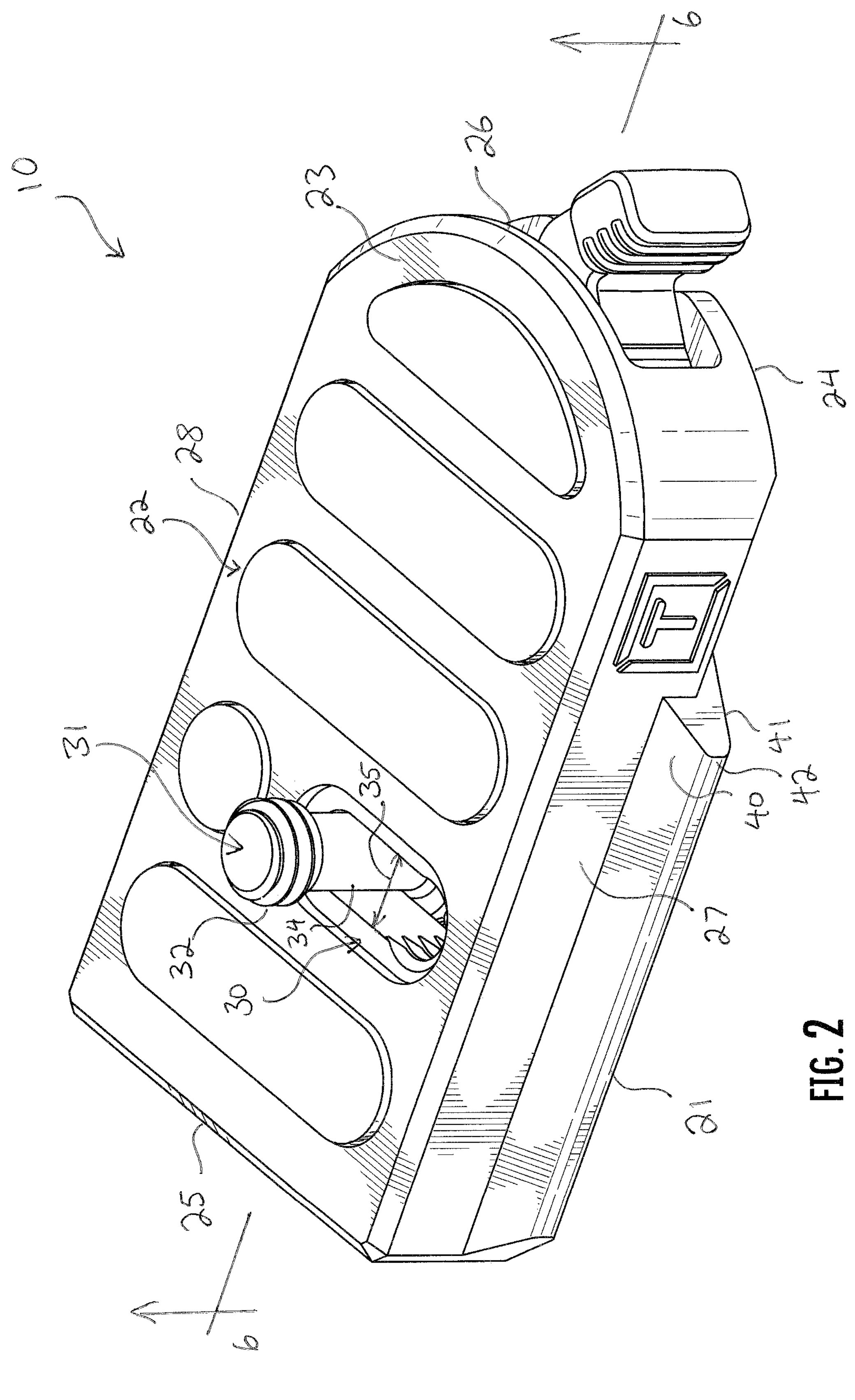
FIGS. 2 and 3 are top and bottom perspective views of the cable routing device, respectively.
Figure 3:
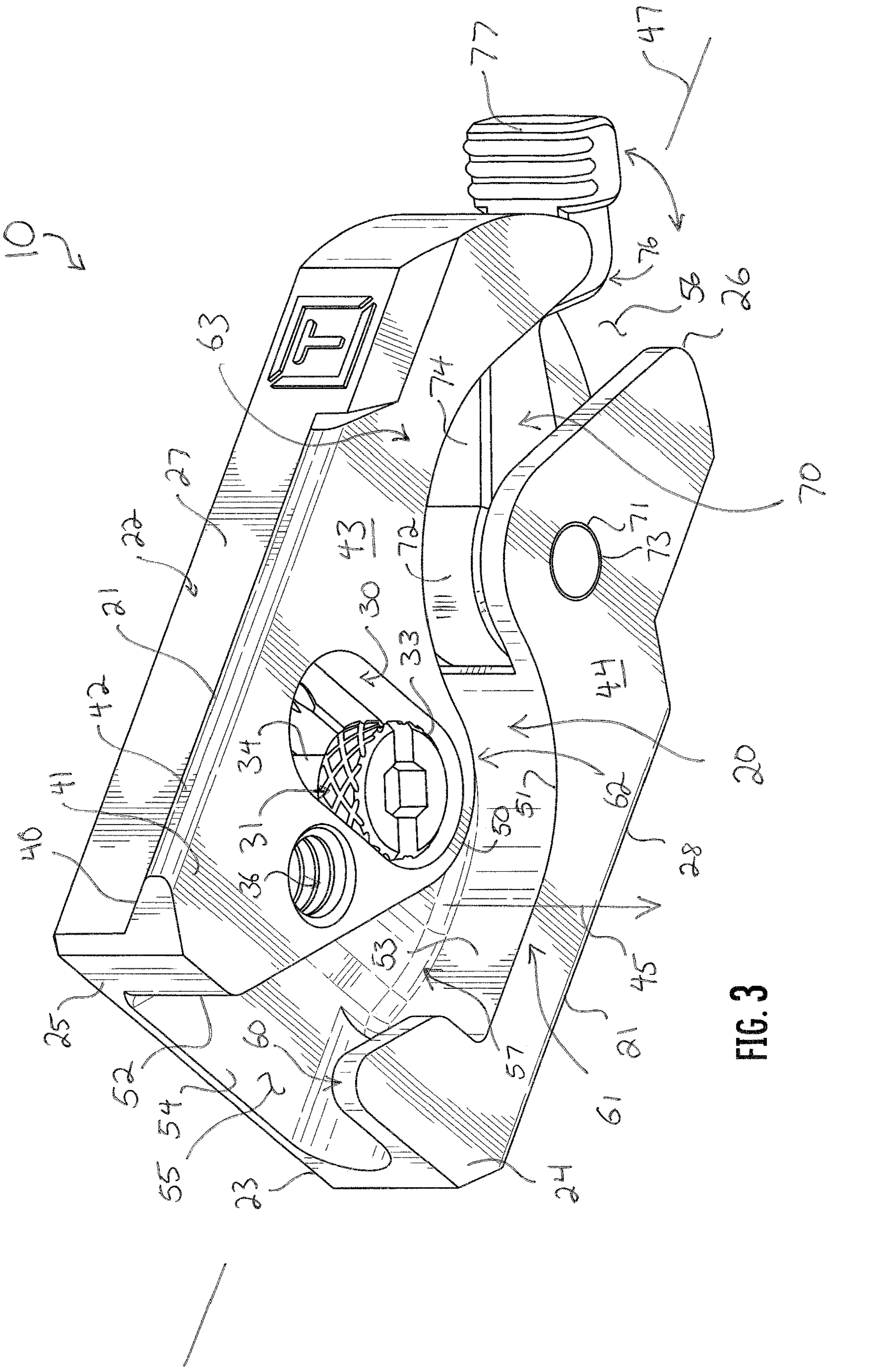

Turning now to the isolated perspective views of FIGS. 2 and 3, the routing device 10 has a plate-shaped body 22 with a top 23, an opposed bottom 24, a first side 25, an opposed second side 26, and opposed long edges 27 and 28 extending between the first and second sides 25 and 26. The body 22 is very roughly rectangular prismatic. The top 23 and bottom 24 are generally flat and are parallel with respect to each other.

The top 23 is formed with a slot 30 aligned between the two long edges 27 and 28. The slot 30 extends entirely through the body 22 from the top 23 to the bottom 24. One end of the slot 30 is threaded. A partially-threaded post 31 is carried in the slot 30. The post 31 engages with a threaded socket on the underside 12 of the camera 11. The post 31 has a first threaded end 32 and an opposed second knurled end 33. Between those, the post 31 has a smooth shank 34. The threaded end 32 and the shank 34 are cylindrical and have a common diameter which is just smaller than an inner dimension 35 of the slot 30. The threads of the threaded end 32 are larger than this inner dimension, however, as is the knurled end 33, such that the post 31 is captured within the slot 30. The post 31 can slide laterally within the slot 30 but is prevented from removal out of the slot 30 by interference between the slot 30 and the threaded and knurled ends 32 and 33.

Figure 7:
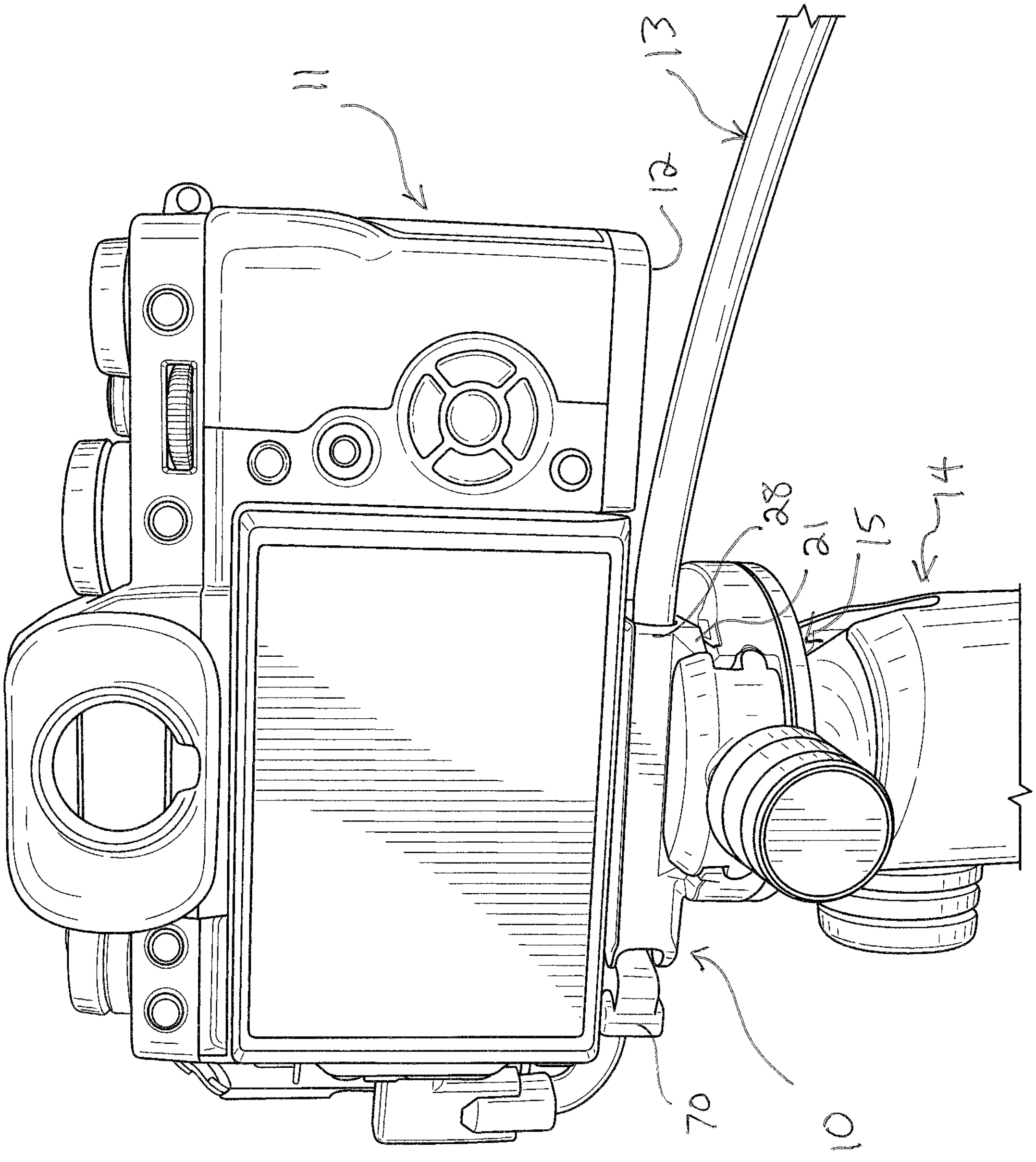
FIG. 7 is a rear perspective view of the cable routing device applied to a camera and secured on a tripod.

The post 31 is useful for coupling the routing device 10 to the underside 12 of the camera 11, as shown in FIGS. 1 and 7. The routing device 10 includes a secondary bore 36 next to the slot 30. The secondary bore 36 is threaded and has a different inner diameter than the inner dimension 35 of the slot 30. The secondary bore 36 allows the photographer to couple the routing device 10 to a tripod or other accessory using a threaded shank of a secondary dimension. The secondary bore 36 preferably, but not necessarily, is blind and does not extend entirely through to the top 23.

The routing device 10 includes features useful for coupling the camera 11 to a tripod, video cage or other mount or accessory. The routing device 10 includes the rail 21 on each of the long edges 27 and 28. In FIG. 2, only one rail 21 is visible, but in FIG. 3, the rail 21 on the long edge 27 is clearly visible and the rail 21 on the long edge 28 is mostly visible. The rails 21 on the two long edges 27 and 28 are identical in structure and opposite in location and orientation. Each includes a long sloping top face 40 and a flat bottom face 41 which is contiguous with the bottom 24 of the body 22. The faces 40 and 41 meet at a rounded edge 42 that extends along the length of the rail 21. The rails 21 engage with a quick-release head on the top of a tripod, so that the photographer can quickly and easily couple and decouple the camera 11 with the tripod, when the routing device 10 is secured to the camera 11.

Figure 4:
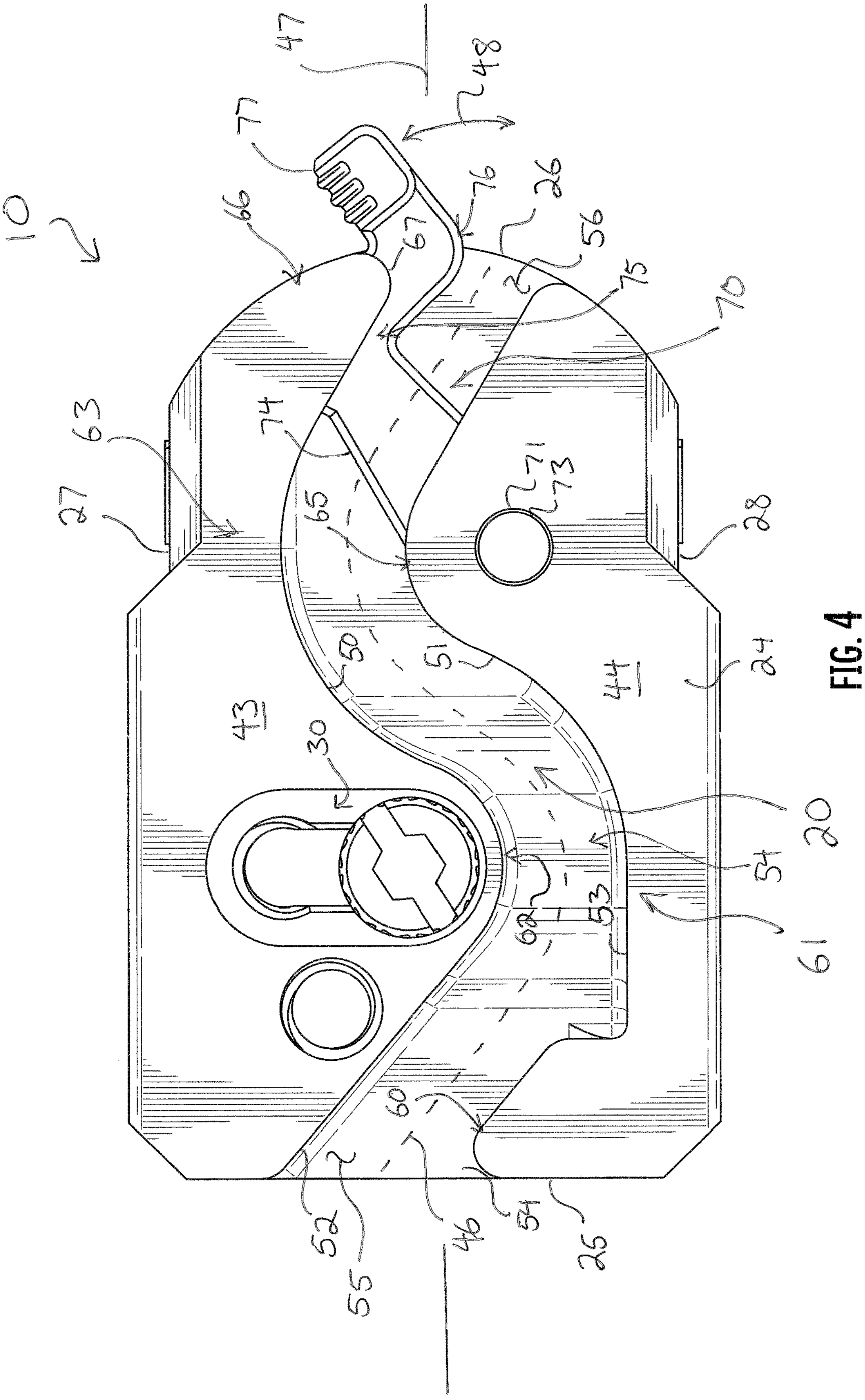
FIG. 4 is a bottom plan view of the cable routing device, showing a latch in a first position.
Figure 5:
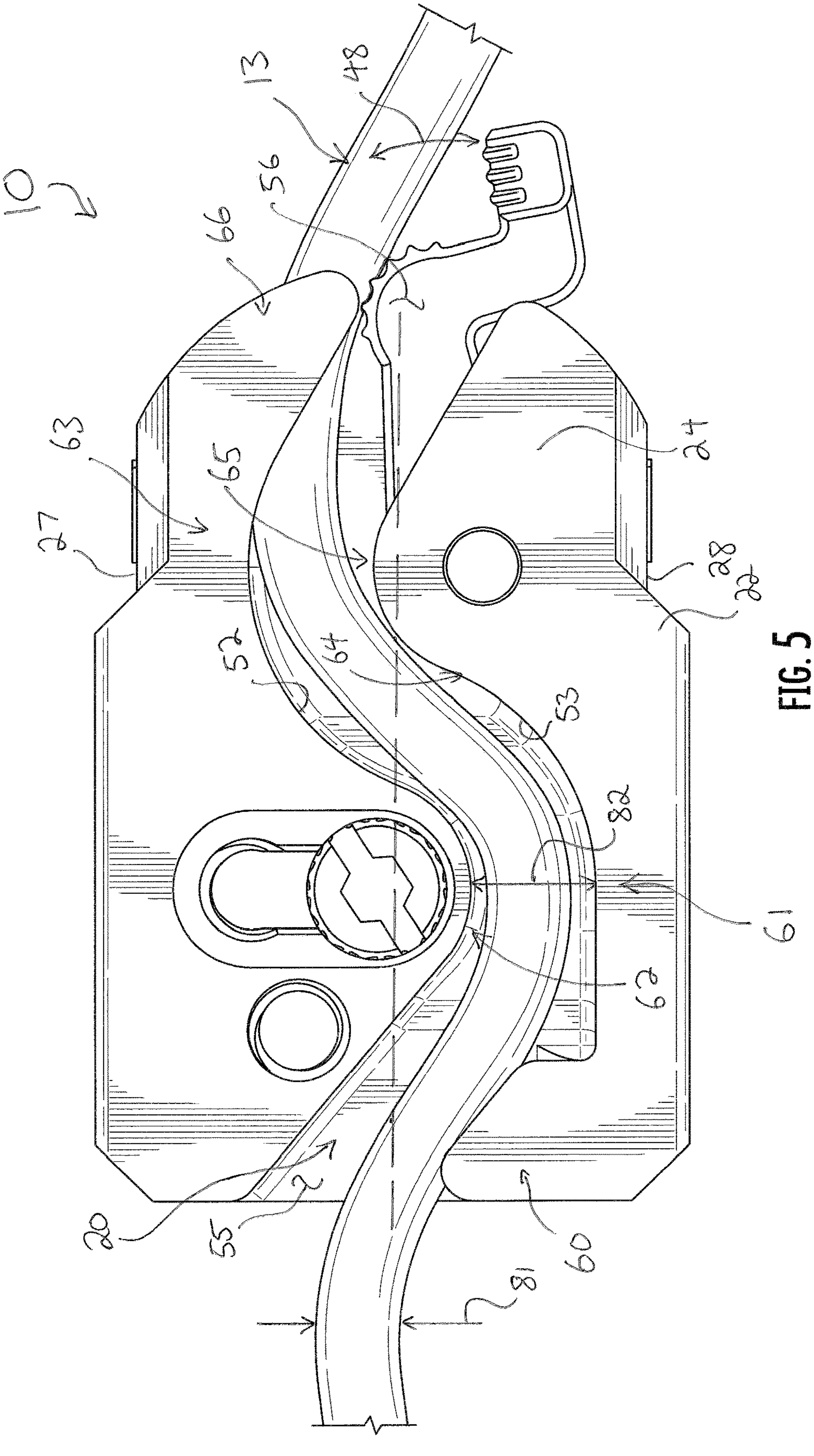
FIG. 5 is a bottom plan view of the cable routing device, showing the latch in a second position, with a cable applied to a channel of the cable routing device.

Referring now primarily to FIGS. 3-5, the channel 20 in the routing device 10 is useful for capturing the cable 13. In some embodiments, the channel 20 extends from the first side 25 to the second side 26 of the body 22 and follows a serpentine path that preferably curves back and forth. In other embodiments, however, the channel 20 has other shapes and contours, or no contour at all; in some embodiments, the channel 20 has a linear arrangement between the first and second sides 25 and 26. In this embodiment, however, the channel 20 is serpentine. A midline for the path is roughly drawn in broken line in FIG. 4 and marked with the reference character 46. The channel 20 is blind: it is closed at the top 23 but is open along the entire length of the path 46, separating the bottom 24 into a first lower face 43 and an opposed second lower face 44 and also largely delineating the body 22 itself into nearly separate portions.

The channel 20 is open in a first direction, indicated by the arrowed line 45 in FIG. 3, away from the top 23. In other words, the channel 20 is accessible from below the routing device 10 by moving an object up, in a direction opposite the arrowed line 45, into the channel 20 at any point along the channel 20 between the first and second sides 25 and 26.

The channel 20 defines a cut into the body 22, such that one portion of the bottom 24 terminates at the channel 20 at a first rim 50 and another portion of the bottom 24 terminates at the channel at a second rim 51. The first and second rims 50 and 51 oppose each other, just inside the channel 20 and just above the bottom 24. The first rim 50 delineates an inner edge of the first lower face 43, and the second rim 51 delineates an inner edge of the second lower face 44.

In some places along the channel 20, first and second rims 50 and 51 bound the channel 20, while in other places, the channel 20 is bound by a full sidewall or sidewalls. Indeed, the channel 20 includes a first sidewall 52 and an opposed second sidewall 53 opposite the first sidewall 52. The channel 20 is bound by those sidewalls 52 and 53 and by a ceiling 54. The first sidewall 52 extends from the first rim 50 up to the ceiling 54 of the channel 20, and the second sidewall 53 extends from the second rim 51 up to the ceiling 54 as well. The ceiling 54 is preferably smooth. The ceiling 54 includes a hump or bump 57 that projects downward from the rest of the ceiling 54, toward the bottom 24. The bump 57 is low and is flanked by portions of the ceiling 54 which are flat and parallel to the bottom 24 and to the first and second lower faces 43 and 44. The bump 57 is registered with the slot 30 and is just larger than the slot 30. In other words, the bump 57 has an upstream-to-downstream length which is approximately twice as large as the inner dimension 35. The bump 57 begins just upstream of the slot 30 and ends downstream of the slot 30, approximately halfway down the channel 20.

Generally, the first and second sidewalls 52 and 53 of the counter follow the contour of the path 46, spaced apart from each by a constant distance and extending directly from the first and second rims 50 and 51 up to the ceiling 54. In some locations, however, the sidewalls 52 and 53 are recessed behind the rims 50 and 51.

As shown in FIG. 3, proximate the first side 25 of the routing device 10, inboard of an entrance 55 to the channel 20, the first sidewall 52 extends vertically and directly from the first rim 50 to the ceiling 54. Across the channel 20, however, the second sidewall 53 is recessed with respect to the second rim 51. The second sidewall 53 is inboard of the second rim 51 and has a concave inner face that curves back from the second rim 51. As such, the bottom 24 forms a tongue 60 that projects laterally into the channel 20. The tongue 60 is cantilevered into the channel 20. A portion of the second rim 51 which is disposed on the tongue 60 and faces into the channel 20 is parallel to an opposite and corresponding portion of the first rim 50.

For orientation and description purposes, the entrance 55 is considered an upstream location or direction, and an opposite exit 56 is considered a downstream location or direction proximate the second side 26. The channel 20 (and the path 46 along which the channel 20 curves) can be considered to move from the upstream location to the downstream location. This description uses the terms upstream and downstream to assist the reader in understanding relative locations and not to limit the structure or function of the routing device 10.

At the entrance 55, the path 46 is arranged roughly toward the long edge 28 and downstream, such that it has a diagonal orientation with respect to a long axis 47 of the routing device 10, as shown in FIGS. 3 and 4.

The tongue 60 terminates inboard of the entrance 55, and the second rim 51 and the second sidewall 53 rejoin each other and are contiguous once again, just downstream of the tongue 60. From there, the first and second sidewalls 52 and 53 reach a first inflection point 61, marked in both FIGS. 3 and 4. Upstream of the first inflection point 61, the second sidewall 53 is roughly parallel to the long edge 28 and the first sidewall 52 is diagonal with respect to the long edge 28. At the first inflection point 61, the second sidewall 53 is still parallel, and the first sidewall rounds a corner and becomes briefly parallel with the long edge 28. Here, the first sidewall 52 defines a first projection 62. The first projection 62 bulges toward the long edge 28. The slot 30 is inboard of the first projection 62 in the body 22.

Downstream from the first projection 62, the path 46 inverts direction with respect to its direction upstream of the first projection 62. The path 46 again has a diagonal orientation with respect to the long axis 47, but here the path 46 is directed toward the long edge 27 and downstream, roughly normal to its direction upstream of the first projection 62. The first and second sidewalls 52 and 53 follow the path 46 here, maintaining a constant spaced arrangement from each other. The path 46 continues to a second inflection point 63.

Figure 6:
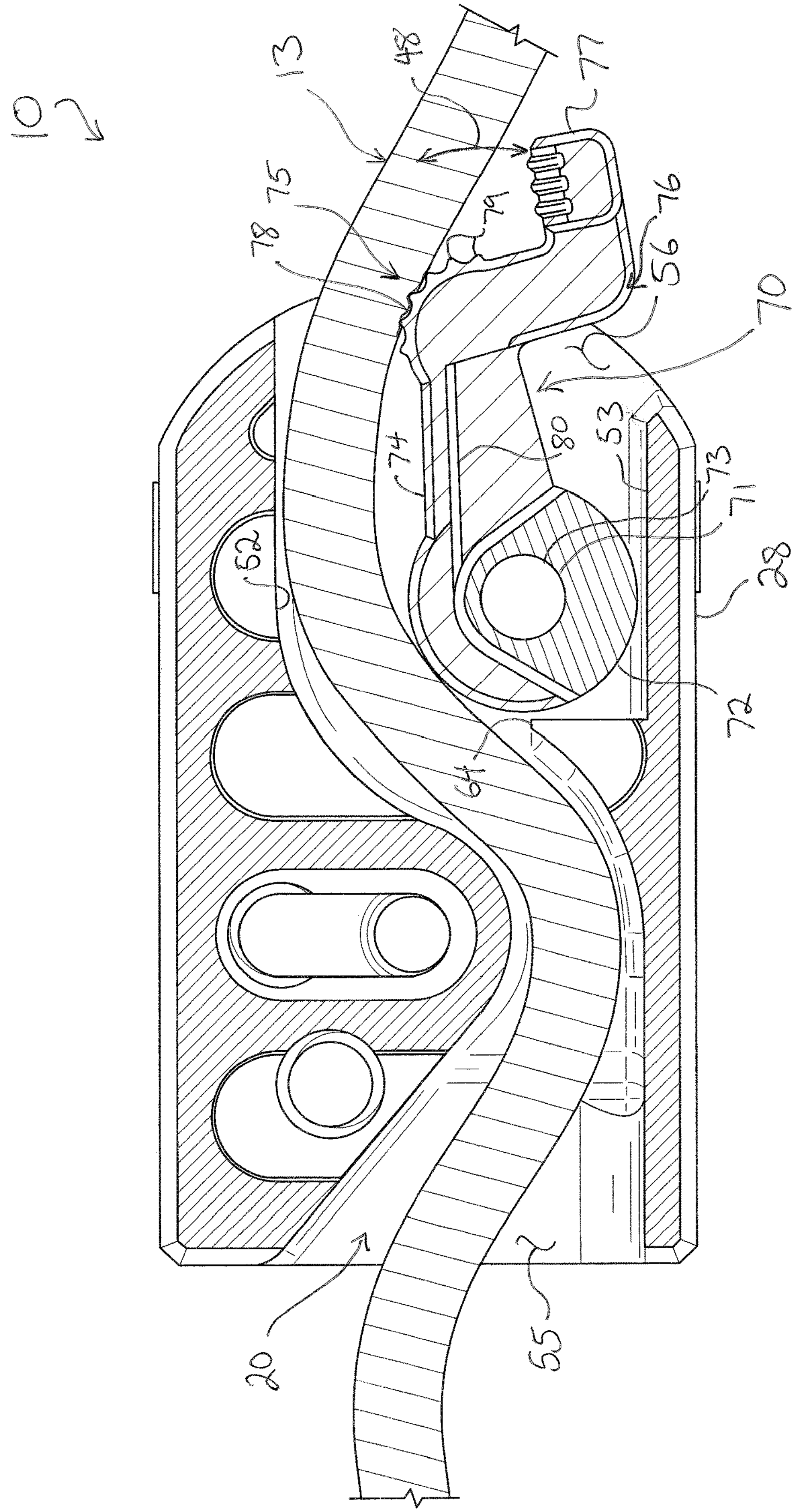
FIG. 6 is a section view taken along the line 6-6 in FIG. 2.

Just before the second inflection point 63, the second sidewall 53 forms a second projection 64, shown in FIG. 6. The second projection 64 is a sharp ramp extending toward the long edge 27 before falling off toward the long edge 28 at the second inflection point 63. The second projection 64 projects into the channel in a direction opposite to that of the first projection 62. At the second inflection point 63, the second sidewall 53 recesses with respect to the path 46. The second sidewall 53 falls back from the second rim 51 and from the second projection 64. From the second inflection point 63 to the exit 56, the second sidewall 53 parallels and stays close to the long edge 28. The first sidewall 52 also parallels the long edge 27 to which it is proximate.

At the second inflection point 63, the path 46 again changes orientation. The path 46 inverts direction with respect to its direction upstream of the second inflection 63. The path 46 again has a diagonal orientation with respect to the long axis 47, but now the path 46 is directed again toward the long edge 28 and downstream, roughly normal to its direction upstream of the second inflection point 63. The path 46 maintains this orientation to the exit 56. While the first and second sidewalls 52 and 53 move apart from the path 46, the first and second rims 50 and 51 continue to stay roughly equidistantly spaced apart from the path 46. As such, each defines a projection before the exit 56.

The bottom 24 forms a tongue 65 that projects laterally into the channel 20 from below the second sidewall 53. The tongue 65 is cantilevered into the channel 20 and is larger than the upstream tongue 60. The first and second projections 62 and 64 are offset from each other, and the two tongues 60 and 65 flank the first and second projections 62 and 64. The tongue 65 extends from just upstream of the inflection point 63 to the exit 56, as best shown in FIGS. 4 and 6. A portion of the second rim 51 which is disposed on the tongue 65 and faces into the channel 20 is parallel to the path 46. The space between the tongue 65 and the ceiling 54 is occupied by a latch, described below.

The bottom 24 also forms a tongue 66 that projects laterally into the channel 20 from below the first sidewall 52. The tongue 66 is cantilevered into the channel 20. The tongue 66 is roughly opposite the tongue 65, and a portion of the first rim 50 which is disposed on the tongue 66 and faces into the channel 20 is parallel to the path 46 and is parallel to and opposite that portion of the second rim 51 along the tongue 65.

The tongue 66 has a shape which corresponds to the curvature of the exit 56 and to the path 46. The inner edge of the tongue 66 is defined by the portion of the first rim 50 on the tongue 66, and that portion parallels the path 46 to a downstream tip 67 of the tongue 66. The tip 67 of the tongue 66 is directed along a diagonal, parallel to the path 46 at that point along the long axis 47. The other side of the tongue 66 is arcuate, following a convex curve of the second side 26 of the body. It meets the first rim 50 at the tip 67, and the tip 67 is rounded at the exit 56.

The routing device 10 includes a trap for capturing the cable 13. The trap has different forms. A preferred embodiment of the trap is discussed below.

Referring primarily to FIGS. 4 and 6, in the space between the ceiling 54 and the tongue 65 is a latch 70. The latch 70 is mounted on a pin 71 for pivotal movement. The pin 71 has an axis parallel to the arrowed line 45 of FIG. 3, the pin 71 rotates about that axis, and so the latch 70 is mounted for pivotal movement in an arcuate direction within a plane which is transverse to the arrowed line 45. In FIG. 4, that plane is parallel to the face of the drawing page. In FIG. 6, that plane is the face of the drawing page.

The latch 70 includes a round base 72 with a central bore 73 fit over the pin 71. The latch 70 has an arm 74 integrally formed and extending from the base 72. The arm 74 includes an elbow bend 75, where the arm 74 changes orientation. Between the base 72 and the elbow bend 75, the arm 74 extends radially with respect to the base 72. Beyond the elbow bend 75, the arm 74 extends circumferentially with respect to the base 72, extending to a second elbow bend 76. From the second elbow bend 76, the arm extends roughly parallel to, yet offset from, the first portion of the arm 74 between the base 72 and the elbow bend 75. The arm 74 terminates at a distal end with a tab 77. The tab 77 is knurled to increase and improve grip. As shown only in the section view of FIG. 6, the elbow bend 75 includes an abutment face 78. The abutment face 78 is knurled to increase and improve its grip on the cable 13. The abutment face includes small ridges 79, spaced apart and oriented along the arrowed line 45.

The latch 70 moves between a first position, shown in FIG. 4, and a second position, shown in FIG. 5. A torsional spring (shown in FIG. 6) biases the latch 70 from the second position toward the first position in a direction along the double-arrowed line 48 in FIGS. 4, 5, and 6. This double-arrowed line 48 lies within the plane of pivotal movement described above. That plane includes and is defined by the double-arrowed line 48 and the long axis 47. When the latch 70 moves toward the first position, it moves the abutment face 78 in this direction toward the first sidewall 52, if a cable 13 is in the channel 20, or against the first sidewall 52, if there is no cable 13 in the channel 20.

The above describes a preferred embodiment of a trap. However, there are other embodiments. For example, and without limitation, in some embodiments, the trap includes a set screw threadably engaged through a threaded bore or barrel in the body 22, adjustable into and out of the channel 20 to set against a channel within the channel 20. In other embodiments, the trap includes a ratchet wheel occupying a portion of the channel 20 which prevents removal of the cable 13 from the channel 20 in a certain direction. In yet other embodiments, the trap includes a strap over the open channel 20, fixed to one of the lower faces 43 and 44 and securable to the other of the lower faces 43 and 44. In yet still other embodiments, the trap includes a rotatable eccentric cam that can be spun in one direction to compress the cable 13 in the channel 20, and then spun in another direction to back off the cable 13 in the channel 20. These, and other embodiments, are all forms of the trap.

With the preferred embodiment of the trap, the photographer moves the latch 70 back, into the second position, before he places a cable 13 in the channel 20. Moving the latch 70 into the second position moves the abutment face 78 away from the first sidewall 52, thereby creating sufficient room within the channel 20 to apply the cable 13 thereto. The channel 20 is closely sized to accommodate the cable 13. It is noted here that the routing device 10 can accommodate cables of different shapes and sizes. The routing device 10 is not limited in its size, and smaller routing devices cables 10 accommodate of smaller diameters, while larger routing devices 10 accommodate cables or larger diameters. Referring to FIG. 5, the cable 13 has an outer dimension 81. The channel 20 has a dimension 82 between the first and second rims 50 and 51. This dimension 82 is generally constant for the entire channel 20 between the first and second rims 50 and 51 and from the entrance 55 to the exit 56, though it is slightly wider upstream of the inflection point 61. The dimension 82 of the cable 13 is approximately only thirty-three percent larger than the outer dimension 81 of the cable 13, so the cable 13 has a close fit within the channel 20.

The channel 20 defines tight curves for the cable 13. The channel 20 follows the path 46, bending and curving from the entrance 55, to the first inflection point 61, to the second inflection point 63, to the exit 56. In that movement, the curves of the channel 20 lie in the plane described above as established by the double-arrowed line 48 and the long axis 47. Moreover, because the channel 20 curves reciprocally between the long edges 27 and 28 in this plane, the curves of the channel 20 are in a direction which is transverse to the direction of the arrowed line 45. In other words, as the channel 20 moves downstream along the path, it reciprocates back and forth in a direction transverse to the direction of the arrowed line 45.

FIG. 5 shows in broken line a midline for the body 22, equidistant between the two long edges 27 and 28. The entrance 55 and the exit 56 are located on the midline. The first projection 62 projects beyond the midline, and the second projection 64 also projects beyond the midline in an opposite direction to the first projection 62. When the cable 13 is placed into the channel 20, the cable 13 must bend (or be bent) to accommodate the tight curves of the channel 20. The first projection 62 forces the cable 13 to press toward the second sidewall 53, and the second projection 64 immediately downstream forces the cable 13 to press toward the first sidewall 52.

Moreover, when the latch 70 is released, the spring 80 biases the latch 70 into the first position, and the abutment face 78 presses into the cable 13 and thus presses the cable 13 against the first sidewall 52. The ridges 79 of the abutment face 78 press into the jacket of the cable 13 and prevent upstream or downstream movement of the cable 13. In other words, once the latch 70 is released, a tug cannot pull the cable 13 out of the entrance 55 or the exit 56.

Moreover, the cable 13 cannot be removed from the channel 20 through the bottom 24. The tight bends of the cable 13 forced upon it by adhering to the curved path 46 cause the cable 13 to bind against the first and second sidewalls 52 and 53, but the tongues 60 and 66 also prevent removal. As seen in FIG. 5, the tongues 60 and 66 are below the cable 13 when it is placed in the channel 20, and the cable 13 cannot be removed from the channel 20 through the bottom 24.

Turning now to FIGS. 1 and 7, when a photographer wants to secure a cable 13 with respect to a camera 11 and also mount that camera 11 to a tripod 14, he uses the cable routing device 10. He threads the post 31 of the routing device 10 into the threaded socket on the underside 12 of the camera 11 to couple the routing device 10 to the camera. Then he connects one end of the cable 13 to the camera 11 at its data port. Next, he pulls the latch 70 back to the second position and lays the cable 13 into the channel 20 from the bottom 24. He is careful to tuck the cable 13 under the tongues 60 and 66 so that the cable 13 is retained by the tongues 60 and 66 and prevented from falling downward. The bump 57 pushes the cable 13 downward, into confrontation with the tongues 60 and 66, to increase the binding friction between the body 22 and the cable 13.

Once the cable 13 is so applied, the photographer places the routing device 10 into the head 15 of the tripod 14. Most conventional tripods 14 have a set of opposed jaws that receive rails similar to the rails 21 on the routing device 10. The rails 21 engage with the head 15, the photographer tightens the jaws or sets the quick-release, and the routing device 10 is securely coupled to the tripod 14, thereby coupling the camera 11 to the tripod 14.

To change a cable 13, the photographer now need only pop the routing device 10 out of the tripod head, pull the latch 70 back to the second position, and remove the cable 13 from the channel 20. The photographer does not need to remove the routing device 10 from the camera 11. This makes cable changing quick and easy.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A cable routing device for managing a cable connected to a camera, the cable routing device comprising:
- a body having a top and an opposed bottom, wherein the top is configured to be applied to the camera;
- a channel extending from one side of the body to an other side of the body, wherein the channel is open in a first direction to the bottom, away from the top; and
- a latch mounted for pivotal movement and biased to move an abutment face of the latch in a second direction transverse to the first direction.

2. The cable routing device of claim 1, wherein the channel curves in the second direction.

3. The cable routing device of claim 1, wherein the channel has a path extending entirely between the one side and the other side of the body, and the channel is open along the entire path.

4. The cable routing device of claim 1, wherein the channel includes:
- a first sidewall including a first projection of the sidewall into the channel; and
- a second sidewall including a second projection of the sidewall into the channel;
- wherein the first and second projections are offset from each other along the channel and project into the channel from opposite directions.

5. The cable routing device of claim 1, further comprising a tongue projecting into the channel at the bottom.

6. The cable routing of claim 5, wherein the tongue defines a first tongue, and a second tongue projects into the channel at the bottom, and the first and second tongues project into the channel from opposite sides of the channel.

7. A cable routing device for managing a cable connected to a camera, the cable routing device comprising:
- a body having a top and an opposed bottom;
- a threaded post extending upward from the top of the body and configured to couple to the camera;
- a channel extending from one side of the body to an other side of the body; and
- a tongue projecting laterally into the channel at the bottom;
- wherein the channel is open in a first direction to the bottom.

8. The cable routing device of claim 7, wherein the channel has a path extending entirely between the one side and the other side of the body, and the channel is open along the entire path.

9. The cable routing device of claim 7, further comprising a trap, wherein the trap is configured to bias a cable applied to the channel in a second direction transverse to the first direction.

10. The cable routing device of claim 7, wherein the channel includes:
- a first sidewall defining a first projection of the sidewall; and
- a second sidewall having a second projection of the sidewall;
- wherein the first and second projections are offset from each other along the channel and project in opposite directions to each other.

11. The cable routing of claim 10, wherein the tongue defines a first tongue, and a second tongue projects into the channel at the bottom, and the first and second tongues flank the first and second projections.

12. The cable routing device of claim 7, further comprising a latch mounted for pivotal movement and biased to move an abutment face of the latch in a second direction, transverse to the first direction, against a sidewall of the channel.

13. The cable routing device of claim 7, further comprising a bump within the channel projecting downward from a ceiling of the channel toward the bottom.

14. A cable routing device for managing a cable connected to a camera, the cable routing device comprising:
- a top configured to be applied to an underside of the camera;
- a channel extending from one side of the cable routing device to an other side, wherein the channel is open in a first direction away from the top; and
- the channel curves in a second direction which is transverse to the first direction.

15. The cable routing device of claim 14, wherein the channel is open entirely between the one side and the other side.

16. The cable routing device of claim 14, further comprising a trap, wherein the trap is configured to bias a cable applied to the channel in the second direction.

17. The cable routing device of claim 14, wherein channel includes:
- a first sidewall defining a first projection of the sidewall; and
- a second sidewall having a second projection of the sidewall;
- wherein the first and second projections are offset from each other along the channel and project in opposite directions to each other.

18. The cable routing device of claim 14, further comprising a latch mounted for pivotal movement and biased to move an abutment face of the latch in the second direction against a sidewall of the channel.

19. The cable routing device of claim 14, further comprising a tongue projecting into the channel along a bottom of the cable routing device.

20. The cable routing of claim 19, wherein the tongue defines a first tongue, and a second tongue projects into the channel at the bottom, and the first and second tongues project in opposite directions to each other.

* * * * *